No. 656,550. Patented Aug. 21, 1900.
G. M. KLEUCKER.
APPARATUS FOR DEAERATING WATER.
(Application filed Nov. 14, 1899.)
(No Model.)
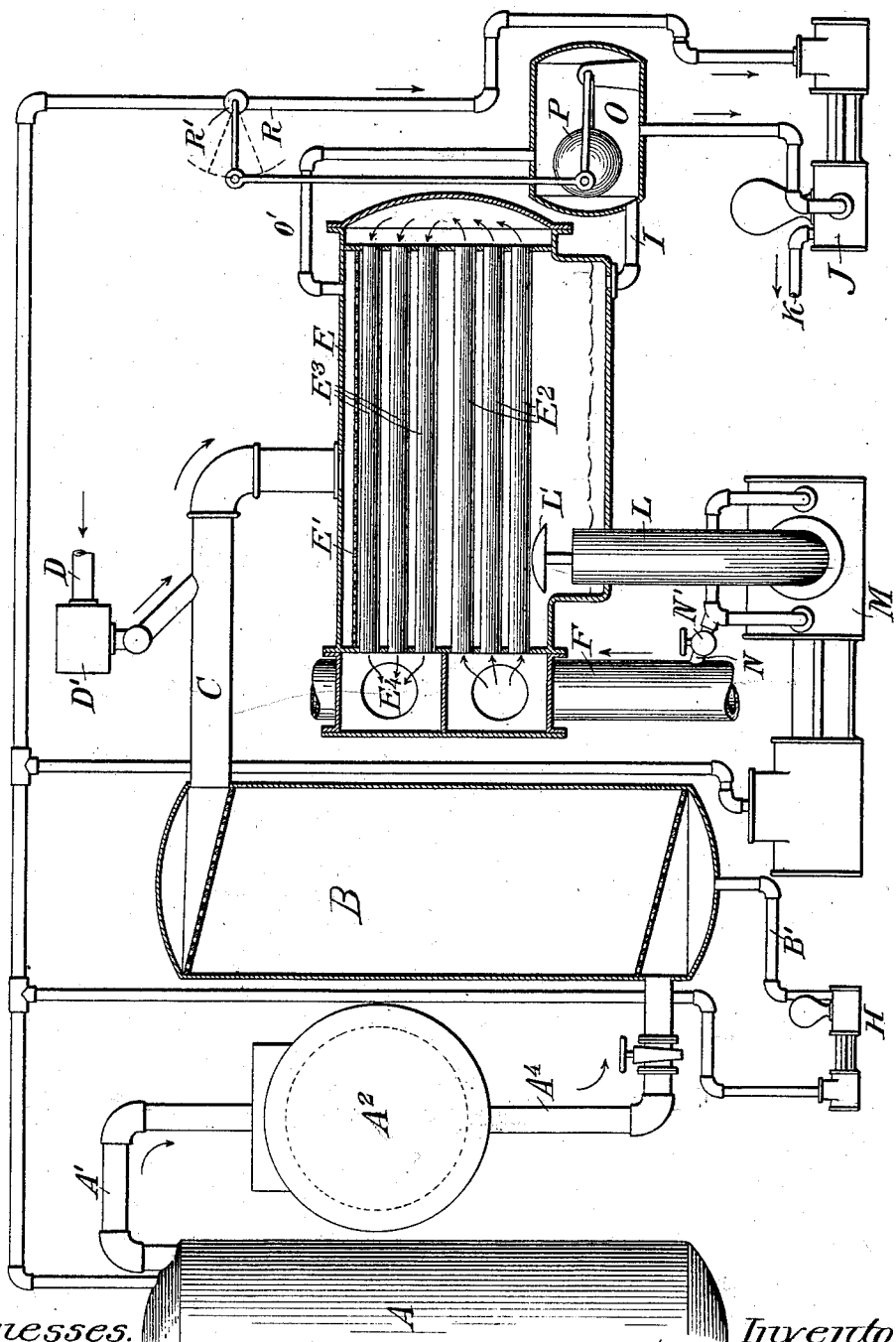
Witnesses.
William Paxton.
J. B. Clautice.
Inventor.
George M. Kleucker,
By Thomas Drew Stetson
Attorney

UNITED STATES PATENT OFFICE.

GEORGE M. KLEUCKER, OF BRUNSWICK, GERMANY.

APPARATUS FOR DEAERATING WATER.

SPECIFICATION forming part of Letters Patent No. 656,550, dated August 21, 1900.

Application filed November 14, 1899. Serial No. 737,005. (No model.)

*To all whom it may concern:*

Be it known that I, GEORGE M. KLEUCKER, a subject of the Emperor of Germany, residing in the city of Brunswick, Duchy of Brunswick, Germany, recently residing in the city of St. Louis, in the State of Missouri, have invented a certain new and useful Improvement in Apparatus for Deaerating Water, of which the following is a specification.

The invention is intended more particularly for preparing water in large quantities for the manufacture of ice, and I will describe it as thus applied.

I assume the cold for the manufacture of the ice to be produced by the expansion of previously compressed and cooled ammonia, the compression being effected by steam-power. My invention provides an apparatus for presenting a quantity of water to the exhaust-steam to become heated and for subsequently treating the exhaust-steam and also all the water therewith (that sometimes called "condensat,") which is produced by the condensation of the steam, and also the previously-added water by exposing the whole in a good vacuum in thin layers flowing over the extended surfaces presented by tubes, and also causing the water to fall in small globules or drops from one tube to another. I have discovered that a moderate degree of heat will cause the expulsion of the air when so large a surface is presented in a vacuum for allowing the separation. I believe that the air comes out of the water in all directions from all the greatly-extended surfaces. I provide for removing the air when it is separated from the water, and thus maintaining the vacuum, and for removing the water without exposing it, so that the air shall not be reabsorbed.

The accompanying drawing forms a part of this specification and represents in an extended and diagrammatic form what I consider the best means of carrying out the invention. It is a side elevation, partly in vertical section.

A is the boiler, A' a steam-pipe, and $A^2$ the cylinders, of a tandem compound engine. The steam in passing through the cylinders acts on pistons and generates power in the long-approved manner which is used in operating a compressor of ordinary construction (not shown) by which the ammonia is compressed and liquefied to be again expanded, so as to absorb heat from water and produce ice in the ordinary manner.

$A^4$ is the exhaust-pipe, conveying steam from the last cylinder of the compound engine to the bottom of a filter B, which is charged with broken coke or other suitable material to arrest any oil and water which may be carried along with the steam. I provide for the removal of such dense fluid by a pipe B', to which is connected a pump H.

D is a pipe controlled by a device D', bringing water and mingling it with the steam. The quality of this water is important. It must be soft. From ordinary sources it should be filtered, so as to remove all impurities which are capable of being thus removed. The purpose of the treatment to which it is to be subjected by my invention is to remove the air from it and by the deaerated water thus introduced to contribute a large accession to the water which is produced by the condensation of the steam with which it is mingled, and thus from both sources to provide the amount required to be manufactured into ice.

In the operation the two fluids—that is to say, the steam which has been used in the engines and the water supplied through the pipe D heated by the steam—flow together through the pipe C into the upper portion of a tubular condenser E. A scatter-plate E' within this condenser receives the water and steam and controls the distribution downward. The water thus supplied falls in separate drops from the scatter-plate upon the uppermost of the tubes $E^3$. A pipe F brings water, which may be salt or otherwise impure, but as cold as is conveniently attainable, into a chamber in the lower part of one end of the condenser E. A portion $E^2$ of the tubes convey this water from the chamber to the opposite end of the condenser, keeping these lower tubes quite cold, and the remainder $E^3$ convey it back again in a much warmer condition to a chamber in the upper part.

$E^4$ is a pipe which leads the impure water away from the condenser after it has absorbed the heat of the steam and throws it into the sewer or other waste-passage.

In its treatment in the condenser the mingled steam and pure water introduced through the pipe C falls from each series of tubes to the series of tubes next below and, spread in a thin coating, flows down on each and drops to the next below, and so on until it reaches the bottom of the interior of the condenser E, where, having become thoroughly deaerated in the thin flowing and dropping action, it accumulates and is drawn out through a pipe I by a pump J, after passing which it meets the ordinary resistance of the atmosphere, increased or diminished by any arrangements which may be made in leading it away through the pipe K to be either immediately or at any required subsequent period subjected to the influence of the expanded ammonia and rapidly lowered in temperature and formed into the required pure and dense ice.

A pipe L extends from a point a few inches above the bottom in the interior of the condenser E and connects with an air-pump M, which, drawing only air and thin vapor, maintains the required vacuum in the spaces between the several tubes $E^2$ and $E^3$. I allow the introduction through a branched pipe N with proper controlling means $N'$ of sufficient water to seal the working parts and the valves.

The deaerated water in its passage from the bottom of the condenser E to the pump J is retained in a vessel O, in which it stands with the water-surface at the same level as in the condenser. An equalizing-pipe connects the upper portions. A float P in this vessel rises and sinks with the changes of the water-level, and by shifting a valve $R'$ in the steam-pipe R, leading from the boiler A to actuate the pump J, causes the latter to work with the right velocity to take the water from the condenser at the rate required.

The arrangement of the receiving end of the pure-water pipe I at the bottom and the arrangement of the corresponding end of the air-pipe L above the bottom of the condenser shielded by the hood shown in connection with the regulator by the float P, insures that the pure water is never wasted by being taken out with the attenuated air and vapor through the air-pump and also that the pure water is removed and stored without exposure to that air or to the general atmosphere, so as to become again aerated.

The water in the lower tubes $E^2$ being freshly received from the cold pipe F is relatively cold and performs mainly the function of condensing the steam. The water after having absorbed heat in the tubes $E^2$ is much warmer in its return course through the tubes $E^3$. On the surface of these latter tubes little condensation is effected; but they serve to spread the steam and water and present a great wetted surface in a heated condition. During the passage of the water slowly downward over these warm tubes the water is in a peculiarly-favorable condition for parting with its air, both the absence of air-pressure and the high temperature making the greatly-extended surface effective.

I attach importance to the fact that the filter B is capacious and is introduced in the steam-passage, so that the large volume of steam is lead through it with little resistance. The effect is greater and materially better than when the filtering action is only applied to the fluid after it has been reduced to the form of water. Any oil which has been introduced in the valve-chest or in the cylinder and has been carried along by the steam is arrested by the filter and decends by gravity and is drawn out through the pipe $B'$ and only pure steam, with such air as accompanies it, is delivered from the top of the filter. I provide that the coke or other filtering material may be changed when desired; but the service may continue without necessarily changing the filter material.

Modifications may be made without departing from the principle or sacrificing the advantages of the invention. The steam-power may be obtained from triple instead of double tandem engines, or a simple engine expanding the steam to a low tension to realize a high economy may be used. A wire screen may serve as an equivalent for the scatter-plate $E'$. I can operate with some success without any such scattering device, depending on the natural tendency of the mingled steam and water to spread on entering the top of the condenser. I may heat the water in a separate vessel and then expose it to a vacuum either in the condenser in which the exhaust-steam from the engine is condensed or in a separate vessel. I may control the admission of water to be prepared and deaerated automatically by a float in the reboiler, receiving-tank, or water-storage tank. (Not shown.) I may dispense with the reboiler. The oil-pump H, the pure-water pump J, and the air-pump M may be driven by other means, as by a belt from the main shaft.

I claim as my invention—

1. In apparatus for deaerating water, the pipe D bringing good water to be deaerated and the pipe C bringing steam from the exhaust-port of a steam engine or engines, in combination with a surface condenser and means as the pumps J, M, and connecting-pipes and the vessel O float P and valve $R'$ for separately removing the air and the water after their separation in the condenser, all arranged for joint operation substantially as herein specified.

2. In apparatus for deaerating water, the pipe D bringing good water to be deaerated and the pipe C bringing steam from the exhaust-port of a steam engine or engines, in combination with a surface condenser E, having two sets of horizontal tubes through which the condensing-water is successively passed the warmer $E^3$ being above the colder $E^2$ and connecting-pipes for separately removing the air and the water after their separation in the condenser, all arranged for joint operation substantially as herein specified.

3. In apparatus for deaerating water, the pipe D bringing water to be deaerated from any convenient source and the pipe C bringing steam from the exhaust-port of a steam engine or engines, in combination with a surface condenser E, having two sets of horizontal tubes $E^2$, $E^3$, and means as the pumps J, M, and connecting-pipes for separately removing the air and the water after their separation in the condenser, and provisions as the branch pipe N, connecting with the supply of water, and controlling means N', for admitting a regulated quantity of water to the air-pump to seal the valve, all arranged for joint operation substantially as herein specified.

4. A deaerating apparatus comprising a strong vessel E, with provisions L, M, for maintaining a vacuum therein, means C for introducing water and steam at a high point and provisions as the scatter-plate E', and the horizontal tubes $E^2$, and $E^3$, for compelling the hot water to be spread in a thin lamina for the escape of the air into the vacuum, combined substantially as herein specified.

In testimony that I claim the invention above set forth I affix my signature in presence of two witnesses.

GEORGE M. KLEUCKER.

Witnesses:
WILHELM LEHRKE,
JULIUS SECKEL.